(12) United States Patent
Bergstrom et al.

(10) Patent No.: US 12,097,466 B2
(45) Date of Patent: Sep. 24, 2024

(54) SUBMERGED WATER DESALINATION SYSTEM PUMP LUBRICATED WITH PRODUCT WATER

(71) Applicant: Natural Ocean Well Co., Culver City, CA (US)

(72) Inventors: Robert A. Bergstrom, Culver City, CA (US); Michael M. Porter, Culver City, CA (US)

(73) Assignee: Natural Ocean Well Co., Culver City, CA (US)

( * ) Notice: Subject to any disclaimer, the term of this patent is extended or adjusted under 35 U.S.C. 154(b) by 173 days.

(21) Appl. No.: 17/732,419

(22) Filed: Apr. 28, 2022

(65) Prior Publication Data

US 2022/0250951 A1  Aug. 11, 2022

Related U.S. Application Data

(63) Continuation of application No. PCT/US2020/058572, filed on Nov. 2, 2020.
(Continued)

(51) Int. Cl.
*B01D 61/08* (2006.01)
*B01D 61/02* (2006.01)
(Continued)

(52) U.S. Cl.
CPC .......... *B01D 61/08* (2013.01); *B01D 61/025* (2013.01); *B01D 61/026* (2022.08); *B01D 61/04* (2013.01);
(Continued)

(58) Field of Classification Search
CPC ....... C02F 1/441; B01D 61/025; B01D 61/08; B01D 2313/243; B01D 61/10;
(Continued)

(56) References Cited

U.S. PATENT DOCUMENTS 3,171,808 A  3/1965 Todd
3,456,802 A  7/1969 Cole
(Continued)

FOREIGN PATENT DOCUMENTS

CN  201031820  3/2008
CN  105971952 A  5/2018
(Continued)

OTHER PUBLICATIONS

Danfoss A/S, "APP pumps: Data sheet," High Pressure Pumps, rosulutions.com, 2014, 36 pages.
(Continued)

*Primary Examiner* — Claire A Norris
(74) *Attorney, Agent, or Firm* — Husch Blackwell LLP (57) ABSTRACT

A submersible water desalination apparatus includes a plurality of water separation membrane elements, a product water collector that receives product water from the membrane elements, and a variable output motorized submersible pump having a suction side that receives product water from the product water collector and a discharge side that pumps product water away from the apparatus through a product water conduit for surface or subsurface use. At least a portion of the product water is used to lubricate and optionally also cool at least a portion of the pump, motor or both the pump and motor.

30 Claims, 5 Drawing Sheets

Related U.S. Application Data (60) Provisional application No. 62/929,564, filed on Nov. 1, 2019.

(51) Int. Cl.

| | | |
|---|---|---|
| *B01D 61/04* | (2006.01) | |
| *B01D 61/06* | (2006.01) | |
| *B01D 61/10* | (2006.01) | |
| *B01D 65/00* | (2006.01) | |
| *C02F 1/44* | (2023.01) | |
| *C02F 103/08* | (2006.01) | |
| *F03G 7/05* | (2006.01) | |
| *F04D 29/58* | (2006.01) | |

(52) U.S. Cl.
CPC ............ *B01D 61/06* (2013.01); *B01D 61/10* (2013.01); *B01D 65/003* (2013.01); *C02F 1/441* (2013.01); *F03G 7/05* (2013.01); *F04D 29/588* (2013.01); *B01D 2311/08* (2013.01); *B01D 2313/06* (2013.01); *B01D 2313/125* (2013.01); *B01D 2313/13* (2013.01); *B01D 2313/206* (2022.08); *B01D 2313/243* (2013.01); *B01D 2313/365* (2013.01); *B01D 2313/367* (2022.08); *B01D 2313/44* (2013.01); *B01D 2313/54* (2013.01); *B01D 2315/06* (2013.01); *B01D 2317/04* (2013.01); *B01D 2319/04* (2013.01); *C02F 2103/08* (2013.01); *C02F 2201/002* (2013.01); *C02F 2201/004* (2013.01); *C02F 2201/006* (2013.01); *C02F 2201/007* (2013.01); *C02F 2201/009* (2013.01); *C02F 2209/03* (2013.01); *C02F 2209/05* (2013.01); *C02F 2209/06* (2013.01); *C02F 2209/22* (2013.01); *C02F 2209/40* (2013.01); *C02F 2303/14* (2013.01)

(58) Field of Classification Search
CPC ............ B01D 2313/54; B01D 2315/06; B01D 2317/04; B01D 61/06; B01D 2311/12; B01D 2313/06; B01D 2313/20; B01D 2313/56; B01D 61/026; B01D 61/04; B01D 61/12; B01D 2311/04; B01D 2311/06; B01D 2311/08; B01D 2311/2649; B01D 2313/125; B01D 2313/13; B01D 2313/18; B01D 2313/24; B01D 2313/246; B01D 2313/26; B01D 2313/36; B01D 2313/365; B01D 2313/367; B01D 2313/44; B01D 2317/06; B01D 2319/04; B01D 61/145; B01D 61/18; B01D 61/22; B01D 61/58; B01D 63/06; B01D 65/003; B01D 71/16
See application file for complete search history.

(56) References Cited

U.S. PATENT DOCUMENTS

| | | |
|---|---|---|
| 4,125,463 A | 11/1978 | Chenowith |
| 4,334,992 A | 6/1982 | von Bonin et al. |
| 4,808,287 A | 2/1989 | Hark |
| 5,192,434 A | 3/1993 | Moller |
| 5,229,005 A | 7/1993 | Fok et al. |
| 5,366,635 A | 11/1994 | Watkins |
| 5,620,605 A | 4/1997 | Moller et al. |
| 5,651,894 A | 7/1997 | Boyce |
| 5,788,858 A | 8/1998 | Acernase et al. |
| 5,914,041 A | 6/1999 | Chancellor |
| 5,944,999 A | 8/1999 | Chancellor et al. |
| 5,972,216 A | 10/1999 | Acernase et al. |
| 5,980,751 A | 11/1999 | Chancellor |
| 6,149,393 A | 11/2000 | Chancellor |
| 6,348,148 B1 | 2/2002 | Bosley |
| 6,540,487 B2 | 4/2003 | Polizos et al. |
| 6,663,349 B1 | 12/2003 | Discenzo et al. |
| 6,800,201 B2 | 10/2004 | Bosley |
| 7,731,847 B2 | 6/2010 | That |
| 7,799,221 B1* | 9/2010 | MacHarg ................. F04B 1/20 |
| | | 210/321.66 |
| 8,282,823 B2 | 10/2012 | Acernase et al. |
| 8,685,252 B2 | 4/2014 | Vuong et al. |
| 9,227,159 B2 | 1/2016 | DuFresne et al. |
| 9,617,172 B1 | 4/2017 | Baski |
| 10,106,441 B2 | 10/2018 | Matani |
| 10,513,446 B2* | 12/2019 | Vuong ................... B01D 61/10 |
| 2005/0171501 A1* | 8/2005 | Kelly ..................... B01D 61/04 |
| | | 604/500 |
| 2006/0065597 A1* | 3/2006 | Kunczynski ........... B01D 61/06 |
| | | 210/321.66 |
| 2008/0025852 A1 | 1/2008 | Davis |
| 2008/0190849 A1 | 8/2008 | Vuong |
| 2008/0290032 A1 | 11/2008 | That |
| 2010/0270236 A1 | 10/2010 | Scialdone |
| 2010/0276369 A1 | 11/2010 | Haag |
| 2010/0300683 A1 | 12/2010 | Looper et al. |
| 2014/0116957 A1 | 5/2014 | Woo |
| 2014/0339169 A1 | 11/2014 | Zeren |
| 2016/0185626 A1* | 6/2016 | Glynn ..................... C02F 1/325 |
| | | 210/170.11 |
| 2016/0333677 A1 | 11/2016 | Westberg et al. |
| 2016/0341209 A1* | 11/2016 | Landi ....................... F04D 29/18 |
| 2017/0306966 A1 | 10/2017 | Valland et al. |
| 2018/0001263 A1 | 1/2018 | Johnson et al. |
| 2018/0065866 A1 | 3/2018 | Matani |
| 2019/0091629 A1* | 3/2019 | Dehlsen ................... B63B 43/06 |

FOREIGN PATENT DOCUMENTS

| | | |
|---|---|---|
| DE | 102007019347 | 8/2008 |
| GB | 2068774 | 8/1981 |
| KR | 101067422 | 9/2011 |
| SU | 979711 | 12/1982 |
| WO | WO 2000/41971 | 7/2000 |
| WO | WO 2009/086587 | 7/2009 |
| WO | WO 2016/010907 | 1/2016 |
| WO | WO 2018/148528 | 8/2018 |
| WO | WO 2018/148542 | 8/2018 |

OTHER PUBLICATIONS

Nortier and Huff, "Design challenges and solutions to a river water transmission system," Pipelines 2014: From underground to the forefront of innovation and sustainability, 2014, 942-951.

Pacenti et al., Submarine seawater reverse osmosis desalination system, Desalination 126, pp. 213-218, Nov. 1999.

Xiaoyan et al., "Optimization design for water buricated bearing clearance of seawater-desalination pump," Journal of drainage and irrigation machinery engineering, Dec. 31, 2010, 2: 117-121, (Abstract).

International Preliminary Report on Patentability from PCT/US2020/058572, dated May 3, 2022, 7 pages.

EP Application No. 20881602.5, EP Extended Search Report dated Nov. 3, 2023, 10 pages.

* cited by examiner

SUBMERGED WATER DESALINATION SYSTEM PUMP LUBRICATED WITH PRODUCT WATER

CROSS-REFERENCE TO RELATED APPLICATIONS

The present application is a continuation under 35 U.S.C. § 111(a) of International Patent Application No. PCT/US2020/058572, filed on Nov. 2, 2020, which claims priority to U.S. Provisional Patent Application No. 62/929,564, filed on Nov. 1, 2019, the disclosures of which are incorporated by reference herein.

TECHNICAL FIELD

This invention relates to undersea pump operation and water desalination.

BACKGROUND ART

The growth of saltwater (e.g., seawater) desalination has been limited by the relatively high cost of desalinated water. This high cost is due in part to energy and capital expenses associated with current desalination systems. Such systems typically employ an onshore facility containing reverse osmosis (RO) desalination or other water separation membranes contained in high-pressure corrosion-resistant housings and supplied with seawater from a submerged offshore intake system. Very high pressures typically are required to drive water through the membranes. For example, the widely-used FILMTEC™ SW30 family of reverse osmosis membrane elements (from DuPont Water Solutions) require about an 800 psi (55 bar) pressure differential across the membrane to meet design requirements. In addition to such high pressures, onshore RO units suffer from high power demands, primarily for pressurizing the feedwater to membrane operating pressures, and for an onshore RO unit these power demands typically average about 13.5 kWh per thousand gallons of produced fresh water. The seawater and the concentrated brine stream produced by a typical onshore RO unit have high corrosion potential and consequently require expensive components and equipment, including pressure vessels and conduits made from specialized alloys. The highly-pressurized water flow also increases maintenance expenses. Onshore RO units typically also require significant amounts of expensive seaside real estate. Shore-based desalination has in addition been criticized for various environmental impacts, including entrainment of marine life in the intake water, greenhouse gas production associated with producing the energy required, discharge of a strong brine stream with the potential to harm marine life, the use of treatment chemicals that may enter the ocean, and onshore land use that is often expensive and may harm local ecosystems. RO units include those described in U.S. Pat. No. 4,334,992 (Bonin et al.), U.S. Pat. No. 5,192,434 (Moller), U.S. Pat. No. 5,620,605 (Moller et al.), U.S. Pat. No. 5,788,858 (Acernase et al. '858), U.S. Pat. No. 5,972,216 (Acernase et al. '216), U.S. Pat. No. 8,282,823 B2 (Acernase et al. '823) and U.S. Pat. No. 9,227,159 B2 (DuFresne et al.).

In the 50 years since the invention of semi-permeable RO membranes, various concepts for submerging water separation membranes and employing natural hydrostatic water pressure to help desalinate seawater have been proposed. Representative examples include the systems shown in U.S. Pat. No. 3,171,808 (Todd), U.S. Pat. No. 3,456,802 (Cole), U.S. Pat. No. 4,125,463 (Chenowith), U.S. Pat. No. 5,229,005 (Fok et al.), U.S. Pat. No. 5,366,635 (Watkins), U.S. Pat. No. 5,914,041 (Chancellor '041), U.S. Pat. No. 5,944,999 (Chancellor '999), U.S. Pat. No. 5,980,751 (Chancellor '751), U.S. Pat. No. 6,149,393 (Chancellor '393), U.S. Pat. No. 6,348,148 B1 (Bosley) and U.S. Pat. No. 8,685,252 B2 (Vuong et al.); US Patent Application Publication Nos. US 2008/0190849 A1 (Vuong), US 2010/0270236 A1 (Scialdone) US 2010/0276369 A1 (Haag) and US 2018/0001263 A1 (Johnson et al.); GB Patent No. 2 068 774 A (Mesple); International Application Nos. WO 00/41971 A1 (Gu), WO 2009/086587 A1 (Haag Family Trust), WO 2018/148528 A1 (Bergstrom et al.), WO 2018/148542 A1 (Bergstrom) and Pacenti et al., Submarine seawater reverse osmosis desalination system, Desalination 126, pp. 213-18 (November, 1999).

Other water desalination technologies have also been proposed, including systems employing microfiltration, nanofiltration, ultrafiltration and aquaporins. These likewise have various drawbacks. In general, submerged water desalination systems do not appear to have been placed in widespread use, due in part to factors such as the energy cost of pumping the desalinated water to the surface from great depth and the difficulty of maintaining component parts at depth.

From the foregoing, it will be appreciated that what remains needed in the art is an improved system for water desalination featuring one or more of lower energy cost, lower capital cost, lower operating or maintenance cost or reduced environmental impact. Such systems are disclosed and claimed herein.

SUMMARY

Compared to land-based water separation, a submerged water separation system can provide several important advantages. For example, submerged operation can significantly reduce pump power requirements, since hydrostatic pressure can provide much or all of the driving force required for desalination, and only desalinated water will need to be pumped onshore. However, should the pump motor or other pump components become worn and require replacement, the flow of product water may diminish or cease, potentially causing water shortages for users. Consequently it is desirable to extend the life of the pump for as long as possible.

The disclosed invention provides in one aspect a submersible water desalination apparatus comprising:
a) a plurality of water separation membrane elements that when supplied with salinated water under sufficient inlet pressure will produce at least partially desalinated product water and concentrate or brine;
b) a product water collector that receives product water from the membrane elements;
c) a motorized submersible pump apparatus having an electric motor portion and a pump portion, the electric motor portion comprising a rotating element supported by at least one bearing and imparting rotation to at least one rotating element in the pump supported by at least one bearing, the pump having a suction side that receives product water from the product water collector and a discharge side that pumps product water away from the desalination apparatus through a product water conduit for surface or subsurface use;
wherein at least a portion of the product water lubricates at least one bearing in the motor or pump.

The disclosed invention provides in another aspect a method for operating a submerged water desalination apparatus, the method comprising the steps of:

a) producing at least partially desalinated product water and concentrate or brine from a plurality of submerged water separation membrane elements;

b) collecting product water in a product water collector that receives product water from the membrane elements;

c) pumping product water away from the desalination apparatus through a product water conduit for surface or subsurface use using a motorized submersible pump apparatus having an electric motor portion and a pump portion, the electric motor portion comprising a rotating element supported by at least one bearing and imparting rotation to at least one rotating element in the pump supported by at least one bearing; and d) lubricating at least one bearing in the motor or pump with at least a portion of the product water.

The disclosed apparatus provides a submerged "Natural Ocean Well" that can provide desalinated water at reduced cost and with improved reliability compared to land-based water desalination systems, and with improved water desalination membrane and product water pump maintenance and lifetimes compared to existing submerged water desalination systems.

BRIEF DESCRIPTION OF THE DRAWING

Like reference symbols in the various figures of the drawing indicate like elements. The elements in the drawing are not to scale.

DETAILED DESCRIPTION

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, an apparatus that contains "a" reverse osmosis membrane includes "one or more" such membranes.

The term "airlift" when used with respect to a pump refers to a device or method for pumping a liquid or slurry by injecting air (and preferably only by injecting air) into the liquid or slurry.

The term "automatic" when used with respect to control of a submerged pump means that the control operates in the vicinity of and based on conditions in such pump, and without requiring the sending of signals to or the receipt of signals from a surface vessel, platform, or other non-submerged equipment.

The term "brine" refers to an aqueous solution containing a materially greater sodium chloride concentration than that found in typical saltwater, viz., salinity corresponding to greater than about 3.5% sodium chloride. It should be noted that different jurisdictions may apply differing definitions for the term "brine" or may set different limitations on saline discharges. For example, under current California regulations, discharges should not exceed a daily maximum of 2.0 parts per thousand (ppt) above natural background salinity measured no further than 100 meters horizontally from the discharge point. In other jurisdictions, salinity limits may for example be set at levels such as 1 ppt above ambient, 5% above ambient, or 40 ppt absolute.

The term "cavitation" when used with respect to a pump transporting a liquid refers to the formation of destructive vapor bubbles within the liquid at low-pressure regions, usually on the inlet side of the pump, and usually followed by the sudden collapse of such bubbles at higher-pressure regions.

The term "concentrate" refers to a water separation apparatus discharge stream having an elevated salinity level compared to ambient surrounding seawater, but not necessarily containing sufficient salinity to qualify as brine in the applicable jurisdiction where such stream is produced.

The term "conduit" refers to a pipe or other hollow structure (e.g., a bore, channel, duct, hose, line, opening, passage, riser, tube or wellbore) through which a liquid flows during operation of an apparatus employing such conduit. A conduit may be but need not be circular in cross-section, and may for example have other cross-sectional shapes including oval or other round or rounded shapes, triangular, square, rectangular or other regular or irregular shapes. A conduit also may be but need not be linear or uniform along its length, and may for example have other shapes including tapered, coiled or branched (e.g., branches radiating outwardly from a central hub).

The term "depth" when used with respect to a submerged water separation apparatus or a component thereof refers to the vertical distance, viz., to the height of a water column, from the free surface of a body of water in which the apparatus or component is submerged to the point of seawater introduction into the apparatus or to the location of the component.

The terms "desalinated water", "fresh water" and "product water" refer to water containing less than 1000 parts per million (ppm), and more preferably less than 500 ppm, dissolved inorganic salts by weight. Exemplary such salts include sodium chloride, magnesium sulfate, potassium nitrate, and sodium bicarbonate.

The term "recovery ratio" when used with respect to a submerged water separation system or apparatus means the volumetric ratio of product water (permeate) produced by the system or apparatus to feedwater introduced to system or apparatus.

The terms "saltwater" and "seawater" refer to water containing more than 0.5 ppt dissolved inorganic salts by weight, and thus encompassing both brackish water (water containing 0.5 to 3.0 ppt dissolved organic salts by weight) as well as water containing more than 3.0 ppt dissolved organic salts by weight. In oceans, dissolved inorganic salts typically are measured based on Total Dissolved Solids (TDS), and typically average about 35 ppt TDS, though local conditions may result in higher or lower levels of salinity.

The term "submerged" means underwater.

The term "submersible" means suitable for use and primarily used while submerged.

The term "wide area" when used with respect to dispersal of a fluid (e.g., concentrate or brine) away from a conduit having a plurality of fluid outlets (e.g., concentrate or brine outlets) distributed along a length of the conduit, means dispersal into an outfall area, and typically into a volume, encompassing at least 5 meters of such length. The disclosed area or volume will also have other dimensions (e.g., a width, diameter or height) that will depend in part upon the direction and velocities of fluid streams passing through the fluid outlets. Because such other dimensions will be affected by variable factors including fluid flow rates inside and outside the conduit, and the overall shape of the dispersed fluid plume, the term "wide area" has been defined by focusing merely on the recited length along the recited conduit, as such length typically will represent a fixed quantity in a given dispersal system.

In the discussion that follows, emphasis will be placed on the use of RO membranes in a submerged RO (SRO) apparatus for carrying out water separation, it being understood that persons having ordinary skill in the art will after reading this disclosure be able to replace the disclosed RO membranes with other types of water separation membranes. Exemplary such other water separation membranes include those based on microfiltration, nanofiltration and ultrafiltration; aquaporins; and other water separation technologies that are now known or hereafter developed and which will be familiar to persons having ordinary skill in the art.

Figure 1:
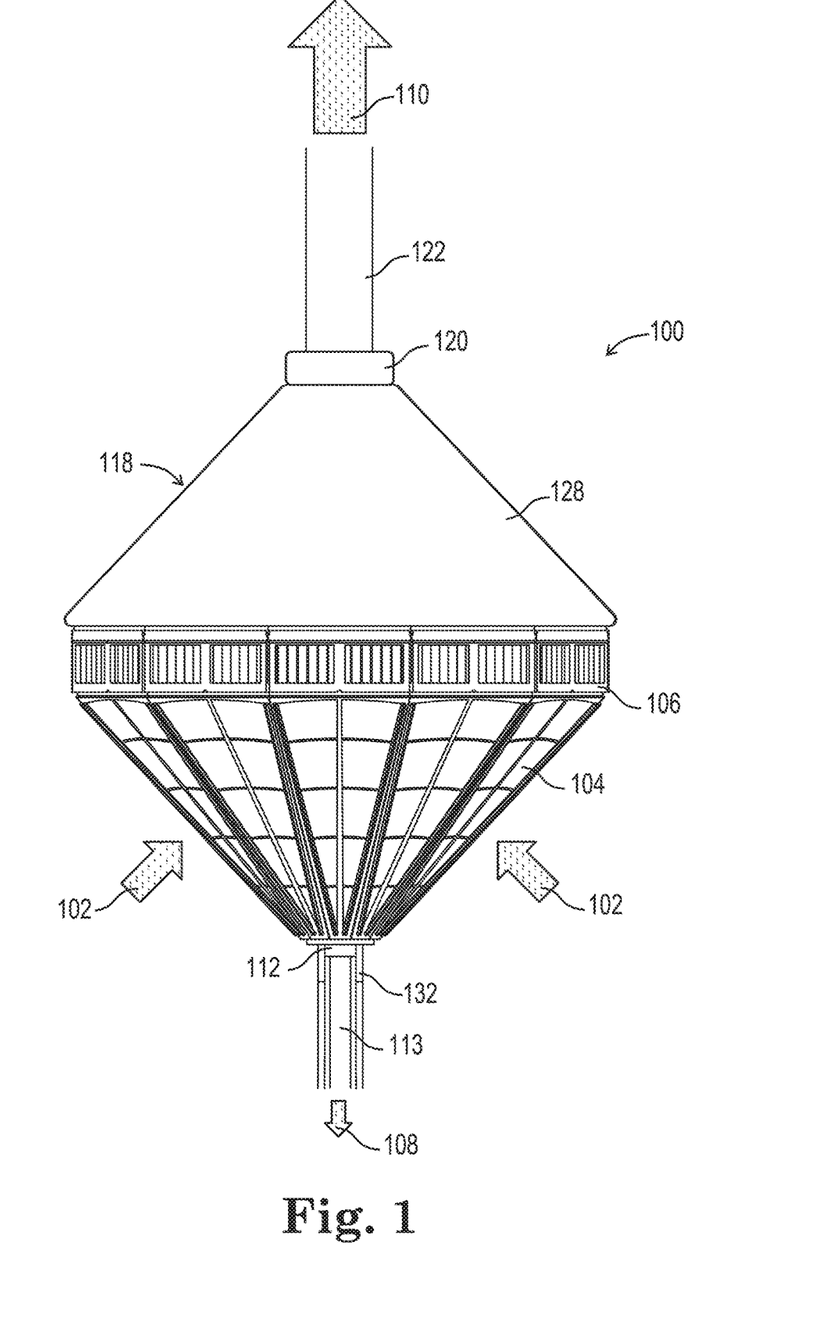
FIG. 1 and FIG. 2 are schematic side views of one embodiment of the disclosed apparatus.
Figure 2:
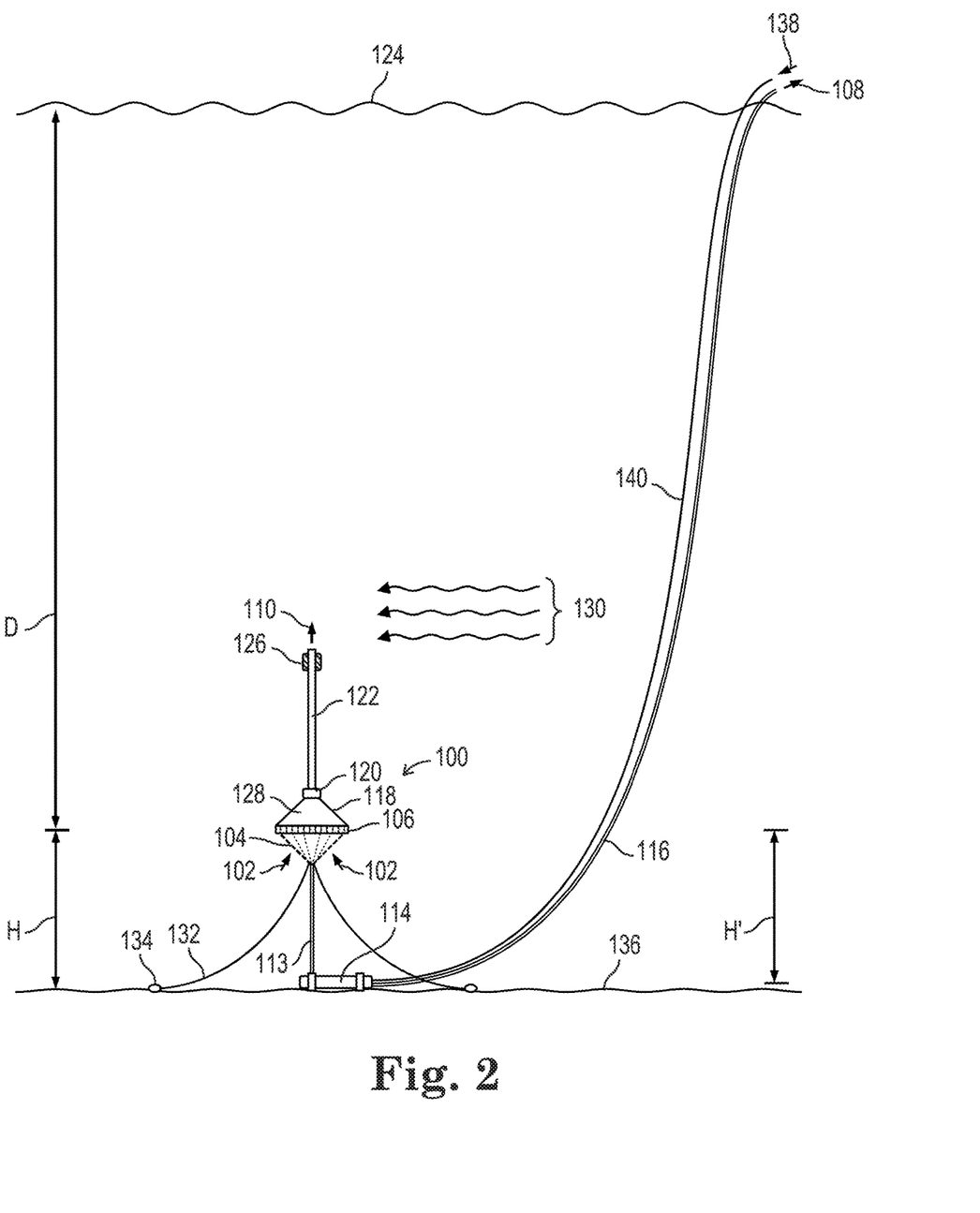

Referring first to FIG. 1 and FIG. 2, SRO apparatus 100 is shown in schematic side view. Raw seawater 102 enters apparatus 100 via prefilter screens 104, and is separated by RO membrane modules 106 into product water permeate stream 108 and concentrate or brine discharge stream 110. Permeate stream 108 passes into permeate collector 112 and thence through permeate conduit 113, submerged pump 114 and delivery conduit 116 to a ship-borne or onshore collection point (not shown in FIG. 1 or FIG. 2) for post-treatment, conveyance or storage for later use. Such uses may include municipal, private or industrial purposes including potable water, bathing water, irrigation water, process water, water storage, water table replenishment, cooling or heat exchange, and a variety of other purposes that will be apparent to persons having ordinary skill in the art. For example, potential cooling or heat exchange applications for such product water include providing or improving the efficiency of air conditioning systems including Sea Water Air Conditioning (SWAC) systems; operating or improving the efficiency of Ocean Thermal Energy Conversion (OTEC) systems (in addition to those discussed herein); and operating or improving the efficiency of Rankine Cycle heat engines (again, in addition to those discussed herein). As discussed in more detail below, permeate stream 108 is also used to lubricate pump 114. In the disclosed apparatus, raw seawater, product water and concentrate or brine may each flow in a variety of directions, e.g., upwardly, downwardly, horizontally, obliquely or any combination thereof. In the embodiment shown in FIG. 2, reverse osmosis membranes within membrane modules 106 are oriented so that concentrate or brine 110 is discharged generally upwardly from the modules 106 and is captured and collected by hood 118. Further details regarding such modules may be found in copending International Application No. PCT/US2020/058569, filed on Nov. 2, 2020 and entitled SUBMERGED WATER DESALINATION SYSTEM WITH REPLACEABLE DOCKABLE MEMBRANE MODULES, the disclosure of which is incorporated herein by reference. Axial pump 120 located at the lower end of riser 122 sends captured concentrate or brine 110 through riser 122 toward surface 124, for further use or dispersal.

In the embodiment shown in FIG. 2, concentrate or brine 110 exits riser 122, whereupon dispersion and dilution takes place in the surrounding seawater. In an additional embodiment (not shown in FIG. 2), concentrate or brine 110 is transported through a further conduit to undergo dispersal (and preferably wide area dispersal) at a significant distance (e.g., at least 50, at least 100, at least 200, at least 300, at least 400 or at least 500 meters) away from apparatus 100, or into a sustained underwater current 130, to be swept away from apparatus 100. In a further embodiment (also not shown in FIG. 2), concentrate or brine 110 is transported through a further conduit for an even greater distance (e.g., all the way to or nearly to surface 124) for further use or dispersal. If desired, the concentrate or brine may instead be discharged in another direction such as downwardly or horizontally, while preferably still undergoing wide area dispersal well away from apparatus 100.

The concentrate or brine may be used for a variety of purposes prior to discharge. In one embodiment, the concentrate or brine has desirable volumetric and thermal utility that may be used to operate an OTEC system and provide operating or surplus power, as discussed in more detail below and in copending International Application No. PCT/US2020/058567, filed on Nov. 2, 2020 and entitled OCEAN THERMAL ENERGY CONVERSION SUBMERGED REVERSE OSMOSIS DESALINATION SYSTEM, the disclosure of which is incorporated herein by reference.

In the embodiment shown in FIG. 2, buoyancy provided by a ring float 126 and a foam layer, e.g., an engineered syntactic foam layer (not shown in FIG. 2) located beneath the surface of hood 128, help maintain apparatus 100 at an appropriate depth D below surface 124. Catenary mooring lines 132 affixed to anchors 134 in seabed 136 help maintain apparatus 100 at an appropriate depth D below surface 124, an appropriate height H above seabed 136, and an appropriate height H' above the inlet to pump 114. Depth D preferably is such that the hydrostatic pressure of seawater at depth D is sufficient to drive seawater 102 through membrane modules 106 and produce product water 108 and concentrate or brine 110 at a desired overall volume and recovery ratio without the need for additional pumps or other measures to pressurize seawater 102 on the inlet side of membrane modules 106. The chosen depth D will vary based on several factors including the pressure drop across the above-mentioned prefilter screens 104; the type, dimensions and arrangement of RO cartridges within the membrane modules 106; the type, sizing and operating conditions of permeate collector 112, permeate conduit 113, product water pump 114 and product water conduit 116; and the type, sizing and operating conditions of axial brine pump 120 and concentrate riser 122. For example, if operating the disclosed SRO apparatus using HYDRANAUTICS™ SWC cylindrical membrane cartridges from Nitto Hydranautics operated without pumps to pressurize the inlet seawater, then operation at a depth of at least about 350 m together with a pump to draw product water from the membrane elements is preferred in order to minimize or eliminate the need for a high pressure vessel surrounding the membrane elements. In some prior SRO designs, especially those that rely on a pressure pump to force seawater through the membranes, thick pressure-resistant vessels are employed to contain the high pressures needed for membrane separation. In preferred embodiments of the present SRO desalination apparatus, the prefilter elements and RO membranes will not require pressure-resistant vessels, as they will already be immersed at a sufficiently high pressure in the fluid to be purified. Desirably the disclosed SRO apparatus merely maintains a sufficiently low pressure on the membrane product discharge side, and a sufficient inlet side-outlet side pressure differential, so as to allow proper membrane operation without the use of a surrounding pressure-resistant vessel.

Greater depths than those needed for operation without a pressure vessel (e.g., at least about 400, at least about 450, at least about 500, at least about 550, at least about 600, at least about 650, at least about 700, at least about 750, at least about 800, at least about 900 or at least about 1,000 m) may be employed if desired, with operation at such greater depths increasing the pump suction head and inlet pressure, and enabling use of the same model pump as might be employed at lesser depths. Such lesser depths may for example be at least about 300, at least about 200 or at least about 100 m, with operation at such lesser depths typically requiring at least one pump to help push seawater through the RO membranes (or a suitable vacuum assist on the outlet side) in order to achieve efficient desalination, and possibly also requiring a pressure vessel surrounding and protecting the membrane elements. Overall exemplary depths for operation of the disclosed SRO desalination system are for example from just below the surface (e.g., from about 10 m), from about 100 m, from about 300 m, or from about 500 m, and up to about 2,000 m, up to about 1,500 m or up to about 1,000 m. Depending on the chosen pump and membranes, preferred depths are from just below the surface to as much as 1500 m depth. Near the surface, the hydrostatic pressure of the ocean typically will need to be augmented by mechanical pumping to provide the trans-membrane pressure differential needed for reverse osmosis.

Depth D may moreover be a fixed depth chosen at the time of installation, or an adjustable depth that may for example be changed following SRO apparatus startup or changed in response to changing conditions (e.g., changing wave, tidal, thermocline or halocline conditions, changing seawater salinity, sea level rise, or changes in the operating efficiency of the RO membranes). In a further embodiment, the disclosed SRO apparatus may include a pressure-seeking capability to enable the system to increase or decrease its depth in order to obtain desired hydrostatic pressures, to optimize or adjust RO operating conditions or to optimize or adjust product water and concentrate or brine delivery.

By way of example, if the disclosed apparatus is operated at a depth of about 700 m, hydrostatic pressure will provide approximately 68 bar on the high-pressure side of the semi-permeable RO membrane. When used with a presently preferred backpressure of 13 bar or less on the product discharge side of the membrane, this will result in a pressure differential across the membrane of 55 bar (approximately 800 psi) or more. In situations of higher- or lower-salinity waters, these depth and pressure values may vary. The inlet pressure will in any event normally be the ocean hydrostatic pressure at the chosen SRO operating depth.

The preferred depth and pressure values set out above may vary in systems that take advantage of future membrane developments enabling or requiring lower or higher differential pressures or higher or lower membrane backpressures. Adjustments to accommodate such developments may increase or decrease the preferred operating depth for the disclosed SRO apparatus. For many membranes, the pressure on the low-pressure side typically will not change appreciably with depth, and consequently changing the depth of operation may suffice to adjust the differential pressure across the membrane and achieve optimal operating conditions.

The heights H (the vertical spacing between the lowest inlets to prefilter screens 104 and seabed 136) and H' (the vertical spacing between the membrane module 106 product water outlets and the inlet to pump 114) in FIG. 2 may for example each represent at least about 3, at least about 5, at least about 10, at least about 20, at least about 40 or at least about 50 m. Lesser heights H and H' may be employed. For example, height H may be reduced to near zero or zero, so that the inlets to prefilter screens 104 are near or at the same depth as seabed 136. However, doing so typically will increase the turbidity of seawater 102 entering modules 106 and the possibility that foreign matter may be drawn through prefilter screens 104 and into modules 106. Also, height H' between prefilter screens 104 and pump 114 may be reduced to near zero, zero or even less than zero (viz., by housing pump 114 inside the screened intake system between the prefilter screens 104 and the modules 106). In such reduced height H' embodiments the pump 114 and prefilter screens 104 preferably will however remain elevated at a sufficient distance above seabed 136 to avoid turbidity that may be present near seabed 136.

The depth of the disclosed apparatus 100, height H' and the diameter of the inlet to pump 114 are desirably sized to provide at least the net positive suction head (NPSH) or greater pressure (viz., the pressure caused by the height of the standing column of product water 108 in permeate conduit 113 and permeate collector 112 between membrane modules 106 and the inlet side of pump 114) sufficient to avoid inlet side cavitation upon startup and operation of pump 114. Further details regarding such cavitation avoidance during startup and operation may be found in copending International Application No. PCT/US2020/058573, filed on Nov. 2, 2020 and entitled SUBMERGED WATER DESALINATION SYSTEM WITH REMOTE PUMP, the disclosure of which is incorporated herein by reference.

As depicted in FIG. 2, pump 114 rests upon and if desired may be moored to seabed 136 or to other natural or artificial structures on the seabed. Pump 114 may if desired be suspended above the seabed, for example in locations where the seabed is uneven or inclined. In one embodiment, pump 114 is suspended beneath apparatus 100 by underwater mooring lines affixed to the apparatus and pump. Pump 114 may if desired be located in other locations, for example affixed to an offshore oil or gas platform, offshore wind farm support, bridge pier or other partly or wholly submerged supporting structure.

Pump 114 and the other pumps referred to herein may be selected from a wide variety of submersible single stage or multistage pumps, including piston (e.g., axial piston), plunger, rotary (e.g., centrifugal impeller pumps and rim-driven shaftless thrusters) and screw pumps that may use a variety of flow schemes including positive displacement, centrifugal and axial-flow principles. Suitable pumps are available from a variety of sources that will be familiar to persons having ordinary skill in the desalination art, and may in appropriate instances be adapted from other fields such as subsea oil and gas exploration, and marine (including submarine) positioning and propulsion. Exemplary pump suppliers include Brunvoll, Cat Pumps, Copenhagen Subsea, Enitech, FMC Kongsberg Subsea AS, Fuglesang Subsea AS, Halliburton, Hayward Tyler, Ocean Yacht Systems, Parker, Rolls Royce, Schlumberger, Schottel, Silent Dynamics, Technical Supply & Logistics, Vetus and Voith. In some embodiments the disclosed pumps include hot-swap connectors to enable them to be removed from the disclosed apparatus while it is submerged, for replacement, repair or rebuilding.

In some embodiments, pump 114 includes one or more sensors, controls or a torque limiting coupling (e.g., a magnetic clutch, hydraulic torque converter, combination thereof or other such device) between the electrical motor powering the pump and the pump impeller so as to limit or avoid inlet side cavitation and accompanying stress or other disturbance of the RO membranes during pump operation. Further details regarding cavitation avoidance during such operation are discussed below in connection with FIG. 2a and FIG. 2b and also may be found in copending International Application No. PCT/US2020/058570, filed on Nov. 2, 2020 and entitled SUBMERGED WATER DESALINATION SYSTEM WITH PRODUCT WATER PUMP CAVITATION PROTECTION, the disclosure of which is incorporated herein by reference.

Figure 2A:
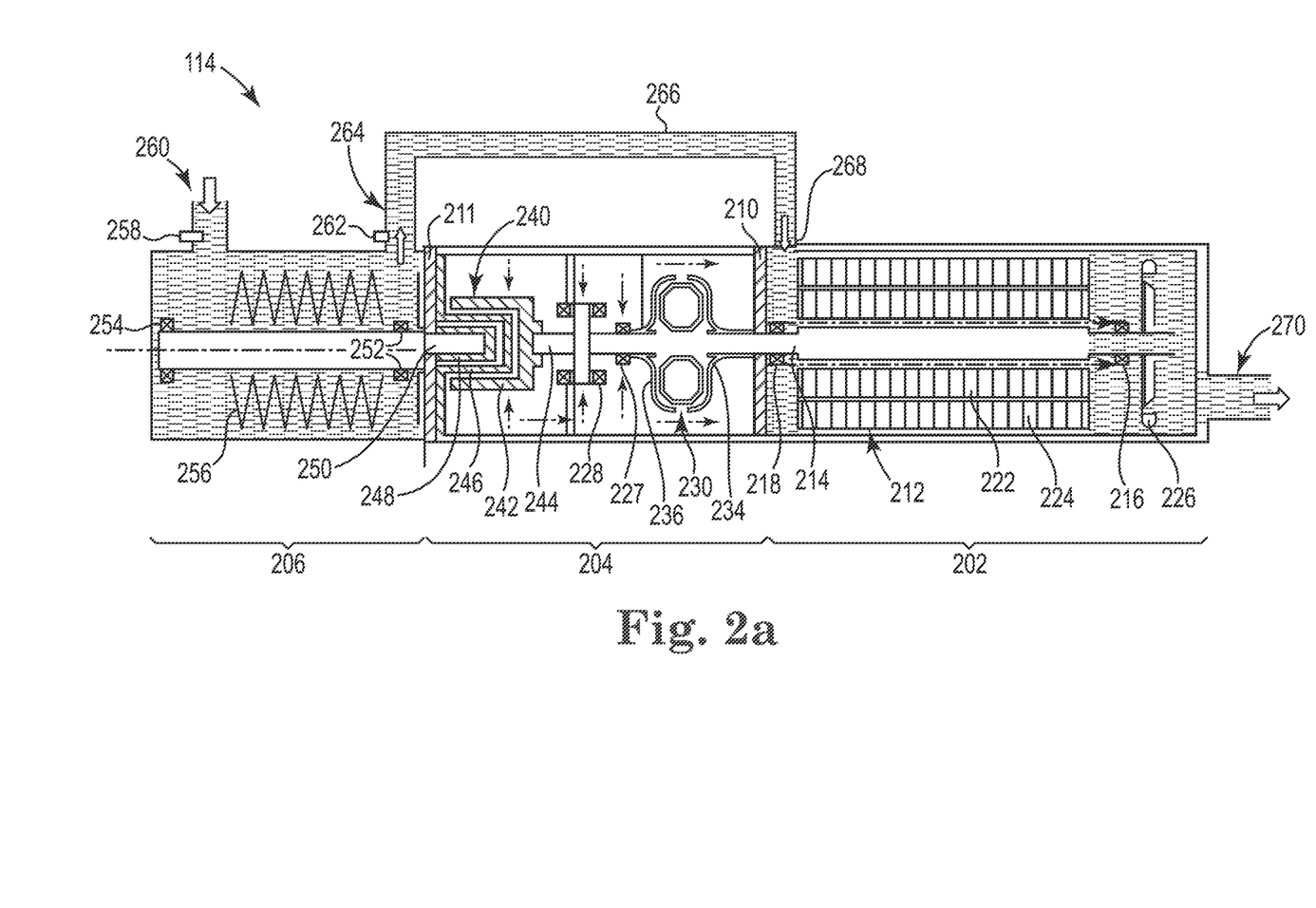
FIG. 2a and FIG. 2b show devices for preventing product water pump cavitation during pump startup and operation, and for carrying out motorized submersible pump apparatus lubrication using product water.

Referring first to FIG. 2a, a preferred embodiment of pump 114 is shown in cross-sectional schematic view. Pump 114 includes a motor section 202, a torque-transmitting section 204 and a fluid pumping section 206. As depicted, motor section 202 is separated from torque-transmitting section 204 by intermediate wall 210, and torque-transmitting section 204 is separated from fluid pumping section 206 by intermediate wall 211. However, either or both of intermediate walls 210 and 211 may be omitted so that motor section 202 and torque-transmitting section 204 share a common interior, torque-transmitting section 204 and fluid pumping section 206 share a common interior, or each of sections 202, 204 and 206 share a common interior. Motor section 202 includes electric motor 212 whose shaft 214 rides in radial bearings 216 and 218. Shaft 214 carries rotor 222 inside stator 224. Coolant circulation impeller 226 preferably is also carried by shaft 214. Motor 212 may be AC or DC, brushed or brushless, synchronous or asynchronous, and may employ permanent magnets or electromagnets. Torque-transmitting section 204 includes axial bearing 227, thrust bearing 228, hydrodynamic coupling 230, magnetic coupling 240 and stub axle 244. The disclosed hydrodynamic coupling and magnetic coupling may be used individually or in combination. In a preferred embodiment, both hydrodynamic coupling and magnetic coupling are employed, and combined with appropriate electronic motor controls to provide cavitation prevention, torque limitation, variable speed drive functionality and a soft start feature. Fluid pumping section 206 may employ a variety of types of single stage or multistage pumps of the various types mentioned above, and may use a variety of flow schemes including positive displacement, centrifugal and axial-flow principles.

Figure 2B:
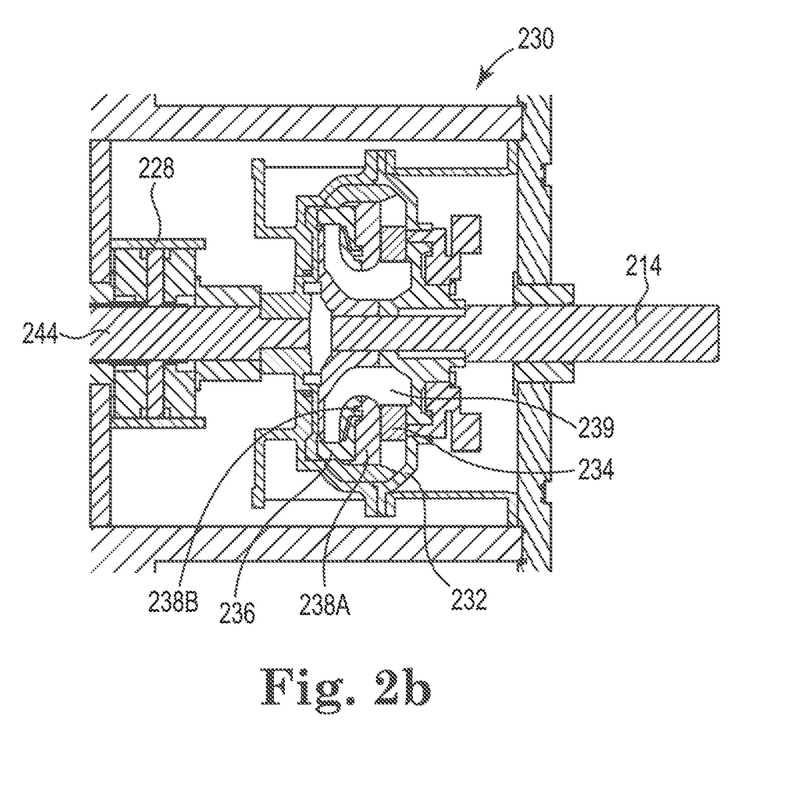

As shown in more detail in FIG. 2b, hydrodynamic coupling 230 includes housing 232 enclosing impeller 234, turbine 236, a plurality of impeller vanes 238A and turbine vanes 238B and fluid 239. The impeller 234 and turbine 236 are preferably arranged in facing relationship to one another in housing 232. Thrust bearing 228 maintains proper axial positioning of impeller 234 and turbine 236. Hydrodynamic coupling 230 provides power transmission based on an indirect operating principle. Driven impeller 234 transfers mechanical energy from motor 212 to kinetic energy via the flow of fluid 239. The shape of the impeller vanes 238A forces fluid 239 to flow in the direction of turbine vanes 238B centrifugally from driven impeller 234 to turbine 236 where reconversion of kinetic to mechanical energy takes place, causing turbine 236 to rotate in the same direction as impeller 234. The torque from motor section 202 required to drive pump section 206 is transmitted via hydraulic forces in hydrodynamic coupling 230 and magnetic forces in magnetic coupling 240 which is shown in FIG. 2a. The amount of torque transmitted from motor 212 to pump vanes 256 will depend on the torque required by pump section 206 and the losses generated in the hydrodynamic coupling 230 and magnetic coupling 240. The relative positions of the guiding vanes 238A and 238B will also control the transmitted torque.

As shown in more detail in FIG. 2a, magnetic coupling 240 transmits force through space without physical contact by using magnetic forces to perform work in a rotary manner. Magnetic coupling 240 includes a magnetic driver portion 242 mounted on stub shaft 244. Nonmagnetic isolator 246 separates driver portion 242 and magnetic follower portion 248 while allowing them to remain in magnetic proximity to one another. Magnetic follower portion 248 is mounted on pump shaft 250 which extends into pump section 206, is supported by radial bearings 252 and 254, and carries pump vanes 256.

Referring again to FIG. 2a, a variety of other devices or systems may be employed to prevent cavitation on the inlet side of product water pump 114 during pump startup or operation. For example, sensor 258 located at or near inlet 260 to pumping section 206 or sensor 262 located at or near outlet 264 from pumping section 260 may be one or more of an acoustic sensor, vibration sensor, flow rate sensor, pressure sensor, oxygen sensor or pH sensor that detects the occurrence or onset of suction side cavitation. As will be appreciated by persons having ordinary skill in the art of pump design, an acoustic sensor, vibration sensor, pressure sensor or oxygen sensor may work best if located near the pump inlet, whereas a flow rate or pH sensor may work best if located near the pump outlet. Resistance values, capacitance values, voltages or other signals from such sensors may be used directly to adjust motor and thus pump speed via input to appropriate control electronics, or may be used to predict and adjust motor and thus pump speed based on modeling or other prediction of the occurrence or onset of suction side cavitation. The disclosed sensors may also be used to actuate an alarm or other signaling device that indicates a reduction in flow and potential need to replace or repair one or more submerged components (e.g., a prefilter, membrane or pump) or to clean one or more conduits in the disclosed apparatus.

In the disclosed apparatus, product water (viz., desalinated or freshwater) is used to lubricate and optionally cool one or more bearings in the disclosed motorized submersible pump apparatus. In preferred embodiments, product water is used to cool and lubricate bearings and other moving parts of at least motor section 202, at least pump section 206, or both motor section 202 and pump section 206. Referring again to FIG. 2a, product water from the disclosed submerged water separation system enters pump section 206 at inlet 260, exits pump section 206 at outlet 264, passes through diverter conduit 266, enters motor section 202 at inlet 268, and exits motor section 202 at outlet 270. Not all the product water passing through pump section 206 need be diverted, and instead if desired only a portion may be so diverted. Diversion of at least a portion of the product water into the motor section can provide lubrication, cooling or both lubrication and cooling to motor 212. Other configurations may be used if desired. For example, at least a portion of the product water may be similarly diverted to cool torque-transmitting section 204 or to lubricate components thereof such as the disclosed radial or thrust bearings. Other configurations may be used if desired, for example by modifying the motorized submersible pumps shown for example in U.S. Pat. No. 9,964,113 B2 (Westberg et al.) and in US Patent Application Publication Nos. US 2014/0105765 A1 (Tonnesson) and US 2017/0306966 A1 (Valland et al.). The motorized submersible pumps in these documents are used in underwater gas- and oil-field applications and employ seawater or fracturing fluids for motor lubrication and cooling. Compared to the such pumps, the present apparatus and method can provide significantly improved pump, motor or bearing longevity by avoiding the use of seawater, fracturing fluids, and other potentially particulate-bearing, corrosive or toxic liquids for lubrication or cooling. In particular, the product water 108 will have been freed of particulates due to the RO membrane or other inherent filtration features of the chosen water separation apparatus. This can enable the pump motor bearings to operate significantly longer and to be designed to closer tolerances since they will be bathed in a reliably pure lubricating medium with no fine grit.

Electrical power and appropriate control signals 138 may be supplied to pump 114 and other components of apparatus 100 through multi-conductor cable 140. The supplied electrical power operates pumps 114 and 120 and as needed other components in apparatus 100, such as a prefilter cleaning brush system. Further details regarding a desirable prefilter cleaning brush embodiment are discussed in more detail in the above-mentioned copending International Application No. PCT/US2020/058569, filed on Nov. 2, 2020.

When operated at sufficient depth, the RO membranes in apparatus 100 will not need to be encased in pressure vessels, and may instead be mounted in a lightweight supporting frame or other housing made from relatively inexpensive and suitably corrosion-resistant materials such as a corrosion-resistant metal skeleton or a housing made from a suitable plastic, fiber-reinforced (e.g., glass fiber- or carbon fiber-reinforced) plastic or other composite, or a variety of other unreinforced or engineered plastics the selection of which will be understood by persons having ordinary skill in the art. Avoiding the need for a pressure vessel greatly reduces the required capital expenditure (CAPEX) for constructing apparatus 100 compared to the costs for constructing a shore-based RO unit. If the RO membranes are individual units (for example, cartridges containing spiral-wound membranes), then avoidance of a pressure vessel also enables modules 106 to be economically designed using a parallel array containing a significantly larger number of cartridges than might normally be employed in a shore-based RO unit, and operating the individual cartridges at a lower than normal individual throughput. For example, the number of cartridges may be at least 10% more, at least 15% more, at least 20% more or at least 25% more than might normally be employed in an onshore RO unit. Doing so can help extend the life of individual membrane cartridges while still providing a desired daily amount of product water. In the embodiment shown in FIG. 1 and FIG. 2, and as discussed in more detail below, modules 106 preferably contain a large array of parallel cylindrical RO cartridges operated not only at such low individual throughput, but also with a reduced recovery rate. Doing so can also provide reduced concentrate salinity, reduced fouling potential, and in preferred embodiments will result in a large volume of concentrate that does not qualify as brine in the applicable jurisdiction, and which has substantial cold thermal energy potential for cooling an OTEC system. For example, permeate stream 108 is depicted in FIG. 1 as having a substantially smaller volume than brine discharge stream 110, corresponding to a low recovery ratio. Exemplary recovery ratios may for example be no greater than 40%, no greater than 30%, no greater than 20%, no greater than 15%, no greater than 10%, no greater than 8% or no greater than 6%, and may for example be less than 3%, at least 3%, at least 4% or at least 5%. The chosen recovery ratio will depend upon factors including the selected RO membranes, and the depth and applicable jurisdiction in which the SRO apparatus operates. The chosen recovery ratio also influences pump sizing and energy costs. By way of example, for an SRO embodiment employing Dow FILMTEC membrane cartridges to treat seawater with an average 34,000 ppm salinity at an 8% recovery ratio, about 8% of the seawater inlet stream will be converted to product water having less than 500 ppm salinity, and about 92% of the seawater inlet stream will be converted to a low pressure or unpressurized brine stream having about 37,000 ppm salinity. By way of a further example, an SRO apparatus employing Nitto Hydranautics membrane cartridges operated at a depth of about 500 m and a 5% recovery ratio may be used to produce concentrate that does not qualify as brine under the current version of the California Water Quality Control Plan.

In one preferred embodiment, the disclosed SRO apparatus operates at a depth of at least about 350 m, does not employ seawater pumps on the RO membrane inlet side, and employs a product (fresh) water pump on the outlet side of the RO membranes to maintain at least a 27 bar and more preferably at least a 30 or 35 bar pressure drop across the membranes, to allow the ocean's hydrostatic pressure to force or to largely help force product water through such membranes. Advantages for such a configuration include a pump requiring much less energy when located at the membrane outlet rather than at the inlet, and the avoidance of, or much lower requirements for, any pressure vessels housing the membranes. Use of membranes with a low required pressure differential will enable operation at lesser depths or using smaller pumps. Currently preferred such membranes include Nitto Hydranautics SWC6-LD membranes (40 bar differential pressure) and LG Chem LG-SW-400-ES membranes (38 bar differential pressure).

Figure 3:
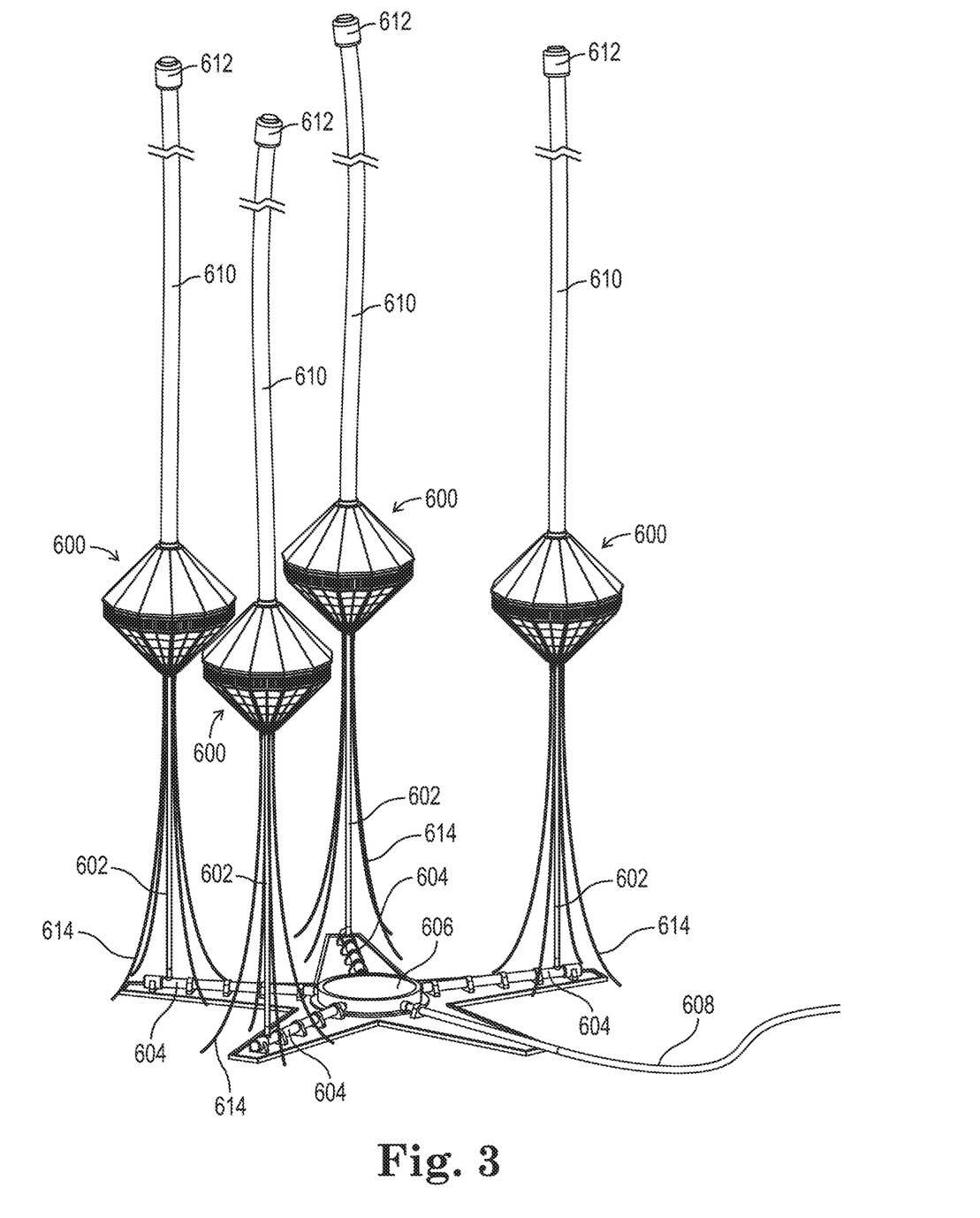
FIG. 3 is a perspective view of a water farm formed by a connected array of the disclosed water desalination systems.

Referring to FIG. 3, a "water farm" containing an array of portable offshore desalination systems ("pods") 600 is shown in perspective view. Product water flows downwardly from the modules 600 through conduits 602 and horizontally through pumps 604 to a centrally located hub 606, and is then pumped towards the surface through delivery conduit 608. Concentrate or brine is pumped upwardly through conduits 610 into ocean currents for dispersal away from the pods 600 or for use in an OTEC system like that discussed above. The conduits 610 may if desired be kept separate from one another, bundled together, or connected to a single larger diameter conduit, and may if desired by equipped with hot-swap water connectors (not shown in FIG. 3) to facilitate disconnection, maintenance or replacement of individual pods 600.

As depicted in FIG. 3, four pods 600 are employed. However, lesser or greater numbers of pods can be used if desired, for example 2, 3, 5, 6, 7, 8, 10, 20 or more pods. Using a plurality of connected pods provides redundancy and enables ready scaleup of the disclosed SRO apparatus to meet initial or growing water needs. Operation and maintenance of the disclosed apparatus can be facilitated by providing a plurality of hot-swap water connectors (not shown in FIG. 3) between each conduit 602 and its associated pump 604, or between each pump 604 and hub 606, or at both the inlet and outlet ends of each pump 604. Scaleup of the disclosed apparatus can be facilitated by providing one or more additional hot-swap water connectors (not shown in FIG. 3) on hub 606 or at another convenient location to enable connection of additional pods or water farm arrays to delivery conduit 608 at a later date. If for example the individual pods 600 shown in FIG. 3 each have a 5 million gallons per day product water capacity, and if five additional hot-swap connectors are included in hub 606, then the FIG. 3 water farm could provide 20 million gallons of product water per day as initially installed, and up to five additional similarly-sized pods 600 could be added in 5 million gallons per day increments to provide up to 45 million total gallons of product water per day. In another embodiment, a plurality of such arrays may be installed near one another to provide multiple instances of the 20 million gallon per day array shown in FIG. 3, thereby providing increased capacity, redundancy and multiplicity of scale for the individual components. In yet another embodiment, the pods are not grouped together as depicted in FIG. 3, and instead are spaced apart across the seafloor, for example to accommodate topographical changes in the seafloor landscape, mooring line locations or other subsea features.

Using 140 of the above-mentioned Hydranautics cartridges in each module, the disclosed SRO apparatus may produce about 5 million gallons per day from a twelve such modules operated at a 5% recovery rate. Other RO membrane suppliers whose cartridges may be used will be apparent to persons having ordinary skill in the art, and include Aquatech International, Axeon Water Technologies, DuPont Water Solutions (makers of the above-mentioned DOW FILMTEC cartridges), Evoqua Water Technologies, GE Water and Process Technologies, Koch Membrane Systems, Inc. and LG Chem. Customized cartridges having altered features (for example, wider gaps between layers, modified spacers, a looser membrane roll, a modified housing or modified ends) may be employed if desired.

In an embodiment, the RO cartridges are mounted in the disclosed modules by adhesively bonding and sealing the cartridges in holes in a perforated divider plate. Further details regarding adhesively mounting such cartridges may be found in copending International Application No. PCT/US2020/058574, filed on Nov. 2, 2020 and entitled ADHESIVELY-BONDED WATER SEPARATION CARTRIDGE MODULE, the disclosure of which is incorporated herein by reference.

The disclosed SRO desalination apparatus may be operated in a variety of locations. In one preferred embodiment, the apparatus is deployed in an ocean trench or dropoff (for example, the Monterey Submarine Canyon, Puerto Rico Trench, Ryukyu Trench, waters surrounding the Hawaiian Islands, and other accessible deep sea sites that will be familiar to persons having ordinary skill in the art), near a populated area in need of desalinated water. The SRO inlet surfaces need not be placed at trench floor depth, and may instead be positioned along the trench wall at a depth sufficient to enable the use of hydrostatic pressure to drive seawater through the osmotic membranes.

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

The invention claimed is:

1. A submersible water desalination apparatus comprising:
   a) a plurality of water separation membrane elements having an inlet side and an outlet side and which membranes when supplied with salinated water under pressure will produce at least partially desalinated product water containing less than 1000 parts per million (ppm) dissolved inorganic salts by weight, and will also produce concentrate or brine;
   b) a product water collector that receives the product water from the outlet side of the membrane elements; and
   c) a motorized submersible pump apparatus having an electric motor portion and a pump portion, the electric motor portion comprising a rotating element supported by at least one motor bearing and imparting rotation to at least one rotating element in the pump supported by at least one pump bearing, the pump having a suction side that receives the product water from the product water collector, and a discharge side that pumps the product water through a product water conduit for surface or subsurface use;
   wherein at least one of the at least one motor bearing or the at least one pump bearing receives, and during operation of the apparatus will be lubricated by, at least a portion of the product water, and wherein lubrication using the product water provides reduced corrosion of the motor or pump portion compared to lubrication using seawater.

2. An apparatus according to claim 1, wherein the water separation membrane elements are reverse osmosis elements.

3. An apparatus according to claim 1, wherein the pump comprises a multistage pump.

4. An apparatus according to claim 1, wherein the pump comprises a positive displacement, centrifugal or axial-flow pump.

5. An apparatus according to claim 1, wherein the pump comprises a piston or plunger pump.

6. An apparatus according to claim 1, wherein the pump comprises a rotary or centrifugal pump.

7. An apparatus according to claim 1, wherein the pump comprises at least one radial motor bearing or at least one radial pump bearing, and the product water lubricates at least one of the at least one radial motor bearing or the at least one radial pump bearing.

8. An apparatus according to claim 1, wherein the pump comprises at least one motor thrust bearing or at least one pump thrust bearing and the product water lubricates at least one of the at least one motor thrust bearing or the at least one pump thrust bearing.

9. An apparatus according to claim 1, wherein the product water lubricates all bearings in the motor or pump.

10. An apparatus according to claim 9, wherein the product water lubricates all bearings in the motor and pump.

11. An apparatus according to claim 1, wherein the product water also cools the motor.

12. An apparatus according to claim 1, wherein the product water cools a rotor or stator in the motor.

13. An apparatus according to claim 1, wherein the product water lubricates and cools the motor and pump.

14. An apparatus according to claim 1, wherein product water lubricates the motor, enters the pump suction side, and then lubricates the pump.

15. An apparatus according to claim 1, wherein lubrication using the product water provides reduced corrosion of the motor and pump portion compared to lubrication using seawater.

16. A method for operating a submerged water desalination apparatus, the method comprising the steps of:
   a) producing from a plurality of submerged water separation membrane elements having an inlet side and an outlet side at least partially desalinated product water containing less than 1000 parts per million (ppm) dissolved inorganic salts by weight and also producing concentrate or brine;
   b) collecting the product water in a product water collector that receives the product water from the outlet side of the membrane elements;

c) pumping the product water through a product water conduit for surface or subsurface use using a motorized submersible pump apparatus having an electric motor portion and a pump portion, the pump having a suction side that receives the product water from the product water collector, and a discharge side that pumps the product water through the product water conduit; and d) lubricating at least one bearing in the motor or pump with at least a portion of the product water;

wherein lubrication using the product water provides reduced corrosion of the motor or pump portion compared to lubrication using seawater.

17. A method according to claim 16, wherein the water separation membrane elements are reverse osmosis elements.

18. A method according to claim 16, wherein the pump comprises a multistage pump.

19. A method according to claim 16, wherein the pump comprises a positive displacement, centrifugal or axial-flow pump.

20. A method according to claim 16, wherein the pump comprises a piston or plunger pump.

21. A method according to claim 16, wherein the pump comprises a rotary or centrifugal pump.

22. A method according to claim 16, wherein the pump comprises at least one radial motor bearing or at least one radial pump bearing, and the product water lubricates at least one of the at least one radial motor bearing or the at least one radial pump bearing.

23. A method according to claim 16, wherein the pump comprises at least one motor thrust bearing or at least one pump thrust bearing and the product water lubricates at least one of the at least one motor thrust bearing or the at least one pump thrust bearing.

24. A method according to claim 16, wherein the product water lubricates all bearings in the motor or pump.

25. A method according to claim 24, wherein the product water lubricates all bearings in the motor and pump.

26. A method according to claim 16, wherein the product water also cools the motor.

27. A method according to claim 16, wherein the product water cools a rotor or stator in the motor.

28. A method according to claim 16, wherein the product water lubricates and cools the motor and pump.

29. A method according to claim 16, wherein product water lubricates the motor, enters the pump suction side, and then lubricates the pump.

30. A method according to claim 16, wherein lubrication using the product water provides reduced corrosion of the motor and pump portion compared to lubrication using seawater.

* * * * *